(12) United States Patent
Rybicki

(10) Patent No.: US 8,613,990 B2
(45) Date of Patent: Dec. 24, 2013

(54) ELASTIC LONGITUDINAL NET OF A CLOSED PERIPHERY, IN PARTICULAR FOR WRAPPING UP SAUSAGE AND FOOD PRODUCTS

(75) Inventor: Karol Rybicki, Piekary Slaskie (PL)

(73) Assignee: Nomanet SP. Z.O.O., Piekary Slaskie (PL)

(*) Notice: Subject to any disclaimer, the term of this patent is extended or adjusted under 35 U.S.C. 154(b) by 0 days.

(21) Appl. No.: 13/700,799

(22) PCT Filed: Jan. 10, 2012

(86) PCT No.: PCT/PL2012/000003
§ 371 (c)(1),
(2), (4) Date: Nov. 29, 2012

(87) PCT Pub. No.: WO2012/096586
PCT Pub. Date: Jul. 19, 2012

(65) Prior Publication Data
US 2013/0295305 A1     Nov. 7, 2013

(30) Foreign Application Priority Data
Jan. 12, 2011   (PL) .......................................... 393624

(51) Int. Cl.
*A22C 13/00*   (2006.01)
*B29D 22/00*   (2006.01)
*B29D 23/00*   (2006.01)

(52) U.S. Cl.
USPC ............................................... 428/34.8; 87/2

(58) Field of Classification Search
USPC ............................................... 428/34.8; 87/2
See application file for complete search history.

(56) References Cited

U.S. PATENT DOCUMENTS 3,606,770 A      9/1971   Kohl

FOREIGN PATENT DOCUMENTS

| AT | 320 462 B | 2/1975 |
| CH | 507 405 A | 5/1971 |
| EP | 0058735 A | 9/1982 |
| EP | 0 802 996 B1 | 7/2002 |
| FR | 2 225 560 A1 | 11/1974 |
| GB | 1207030 A | 9/1970 |
| RU | 2 383 137 C1 | 3/2010 |

OTHER PUBLICATIONS

International Search Report for PCT/PL2012/000003, mailed Apr. 23, 2012, 3 pages.

*Primary Examiner* — Michael C Miggins
(74) *Attorney, Agent, or Firm* — William J. Sapone; Ware Fressola Maguire & Barber LLP

(57) ABSTRACT

An elastic longitudinal net (1) for longitudinal food products, especially cold meat products, is formed as a sleeve having at least one longitudinal main warp (21) of a tightening chain weave having at least one substantially inextensible thread (213, 214), and at least one weft (3) having at least one elastic fiber and circumferential sections (31), the ends of which are interweaved substantially perpendicularly between the substantially inextensible fiber and longitudinal sections (32) existing between neighboring circumferential sections (31) and running in a concurrent manner relative to and weaved with at least one main warp (21). The longitudinal sections are interweaved through at least one main warp (21) substantially perpendicularly relative to its longitudinal axis, passing through loops (215, 216) of the at least one substantially inextensible thread (213, 214) of the main warp, forming a serpentine run having at least two external loops (321).

13 Claims, 3 Drawing Sheets

ELASTIC LONGITUDINAL NET OF A CLOSED PERIPHERY, IN PARTICULAR FOR WRAPPING UP SAUSAGE AND FOOD PRODUCTS

CROSS REFERENCE TO RELATED APPLICATIONS

This application is a U.S. national stage of International patent application no. PCT/PL2012/000003, filed Jan. 10, 2012, which claims priority in Polish patent application number P.393624, filed Jan. 12, 2011, the contents of which are hereby incorporated by reference.

TECHNICAL FIELD

The invention relates to an elastic longitudinal net of a closed periphery, suitable in particular for longitudinal food products and especially cold meat products, having a form of a sleeve comprising at least one longitudinal main warp of a tightening chain weave having at least one substantially inextensible thread, and at least one weft comprising at least one elastic fiber and having circumferential sections, the ends of which are interweaved substantially perpendicularly between the at least one substantially inextensible thread of said at least one main warp, and longitudinal sections between neighboring circumferential sections and running substantially concurrently relative to and weaved with the at least one main warp.

BACKGROUND OF THE INVENTION

Typical elastic nets for cold meat products of a closed periphery, known from the prior art, comprise many parallel longitudinally inextensible warps, weaved with one continuous elastic weft running peripherally and helically along the length of a net axis which weaves with warps in successive nodal points arranged along the length of a net. Exemplary nets of this type are disclosed in patent applications GB 1 207 030, EP 0 802 996 and EP 0 058 735.

Characteristic feature of these kinds of nets is that a crosswise cut of such a net perpendicularly relative to a net axis results also in cutting a helically running weft what in turn causes that a net either unplaits or considerably loosens and deforms, and in consequence slides off from a food product.

Such a problem does not occur in nets produced directly on a product using tying machines, which tie separated and parallel to each other elastic peripheral wefts on a series of parallel warps. Nonetheless an important drawback of a net produced using such machines is a long time of a production process which results from a necessity of nodal weaving of wefts with warps in all points of their mutual intersections.

For elimination of the above-mentioned drawbacks nets produced directly in a form of a tubular sleeve in one weaving process have been proposed in the prior art comprising many circumferential weft loops parallel to each other and perpendicular to the net longitudinal axis, wherein threads forming the wefts are sectionally interknitted with warps on sections between the loops. Exemplary nets of this kind are disclosed in Russian patent applications RU 2383137 and RU 2346441. Though such nets do not get unplaited if they are cut crosswise, they are still circumferentially inextensible and extensible only in a longitudinal direction. Furthermore, individual sections of each weft loop are formed from individual threads.

Another solution overcoming the above-mentioned drawbacks of typical nets having continuous helical wefts has been proposed in a British patent application GB 993,531 which discloses an elastic tubular net for cold meat products formed from a woven sheet of a net comprising parallel to each other, inextensible warps weaved with elastic wefts parallel to each other and perpendicular to the warps. Tubular form of a net is formed by a connection of the sheet edges parallel relative to the warps by means of a longitudinal stitch that connects the extending warps of the sheet. The longitudinal stitch of the net does not unplait after crosswise cutting thereof so a net formed by sewing together this sheet has a form of a cylinder with elastic circumferential wefts parallel to each other and inextensible longitudinal warps and a longitudinal stitch, wherein crosswise cutting the warps and/or the stitch does not result in unplaiting a net, thereby featuring good functionality in particular with regard to cold meat products. However producing such a net is relatively complicated and thus time-consuming and expensive. In a general case production of such a net requires a separate process of producing net sheets and a separate process of connecting each sheet with a longitudinal stitch to form a finished tubular net.

It has been an object of the present invention to provide an elastic net of a closed periphery which would be circumferentially extensible and substantially longitudinally inextensible and which would not get unplaited after crosswise cutting thereof and from the other hand would be produced in a simple manner, preferably in a single automated weaving process. In particular such a finished net should be suitable for covering longitudinal food products, and especially cold meat products.

SUMMARY OF THE INVENTION

In order to accomplish the aforementioned and other objects according to the present invention there is provided an elastic longitudinal net having a closed periphery of the kind mentioned in the outset, in which the longitudinal sections of the at least one weft are at least once interweaved through the at least one main warp substantially perpendicularly relatively to its longitudinal axis, passing through loops of the at least one substantially inextensible thread of the at least one main warp, and form a serpentine run comprising at least two external loops.

In preferred embodiments, said longitudinal sections of the at least one weft, which are weaved with the at least one main warp, are at least partially coated with an adhesive, and in particular an edible glue.

The net according to the present invention advantageously comprises at least one additional warp substantially parallel to the at least one main warp, wherein longitudinal sections of the at least one weft are interweaved perpendicularly between threads of the at least one additional warp.

Inextensible fibers of the net according to the present invention are preferably made of polyester, whereas elastic fibers are advantageously made of rubber latex.

Moreover, said at least one elastic fiber of said at least one weft may be advantageously provided with an external, preferably helical, braid made of inextensible fibers, preferably polyester fibers.

The net of the construction according to the present invention may be directly produced straight in a circumferential form in one weaving process that may be carried out using well-known raschel or warping machines.

Furthermore, the employed weave causes that the net according to the present invention does not unplait even after cutting all fibers of the warp located between two neighboring circumferences of the weft and at the same time does not result in excessive extensibility of the warps despite introducing an elastic weft fiber into the main warp, which is generally undesirable in the majority of net uses.

Moreover, if required, even this inconsiderable longitudinal extensibility of main warp or warps comprising interweaved elastic fibers may be practically entirely eliminated using appropriate glue applied on longitudinal sections of interweaves of elastic weft fiber with a warp.

BRIEF DESCRIPTION OF THE DRAWINGS

This and other features of the invention shall be presented below in exemplary embodiments and in connection with the attached drawings on which.

DETAILED DESCRIPTION OF THE PREFERRED EMBODIMENTS

Figure 1:
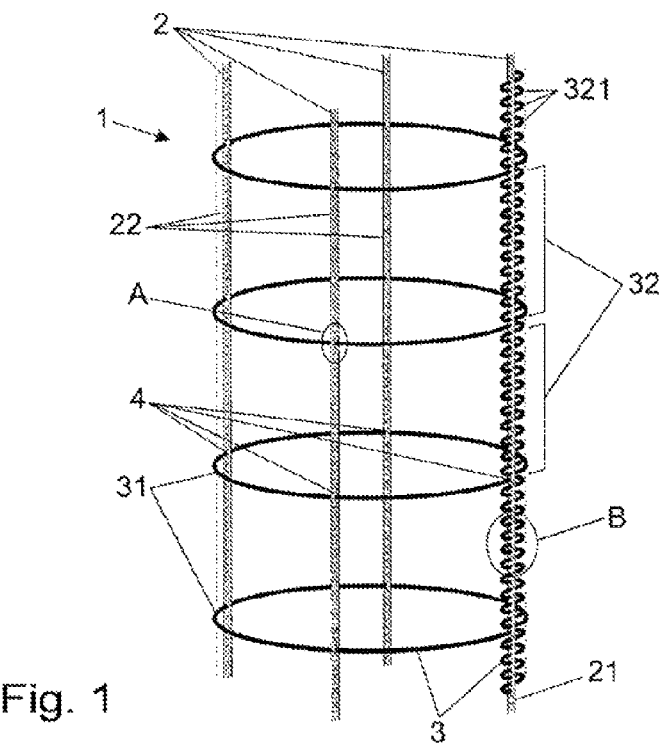
FIG. 1 illustrates schematically an embodiment of a net according to the present invention in a perspective view.

A net 1 presented in FIG. 1 has a form of a sleeve formed by longitudinal warps 2 and a weft 3.

Figure 2:
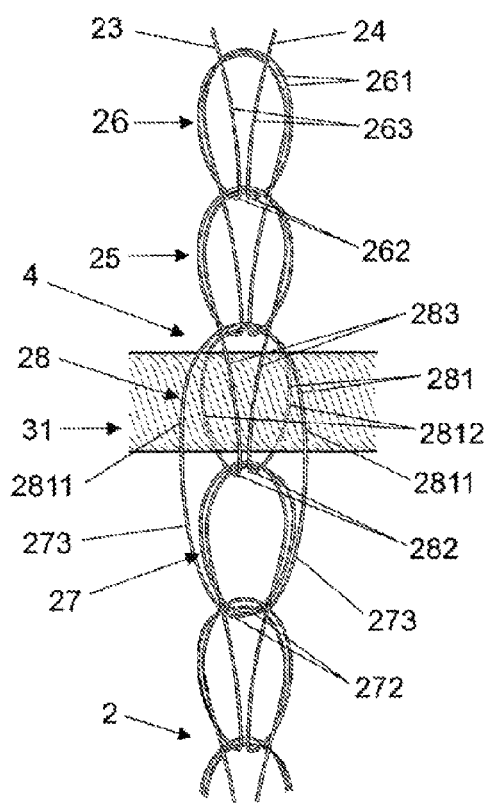
FIG. 2 illustrates region A of the net from FIG. 1.
Figure 3:
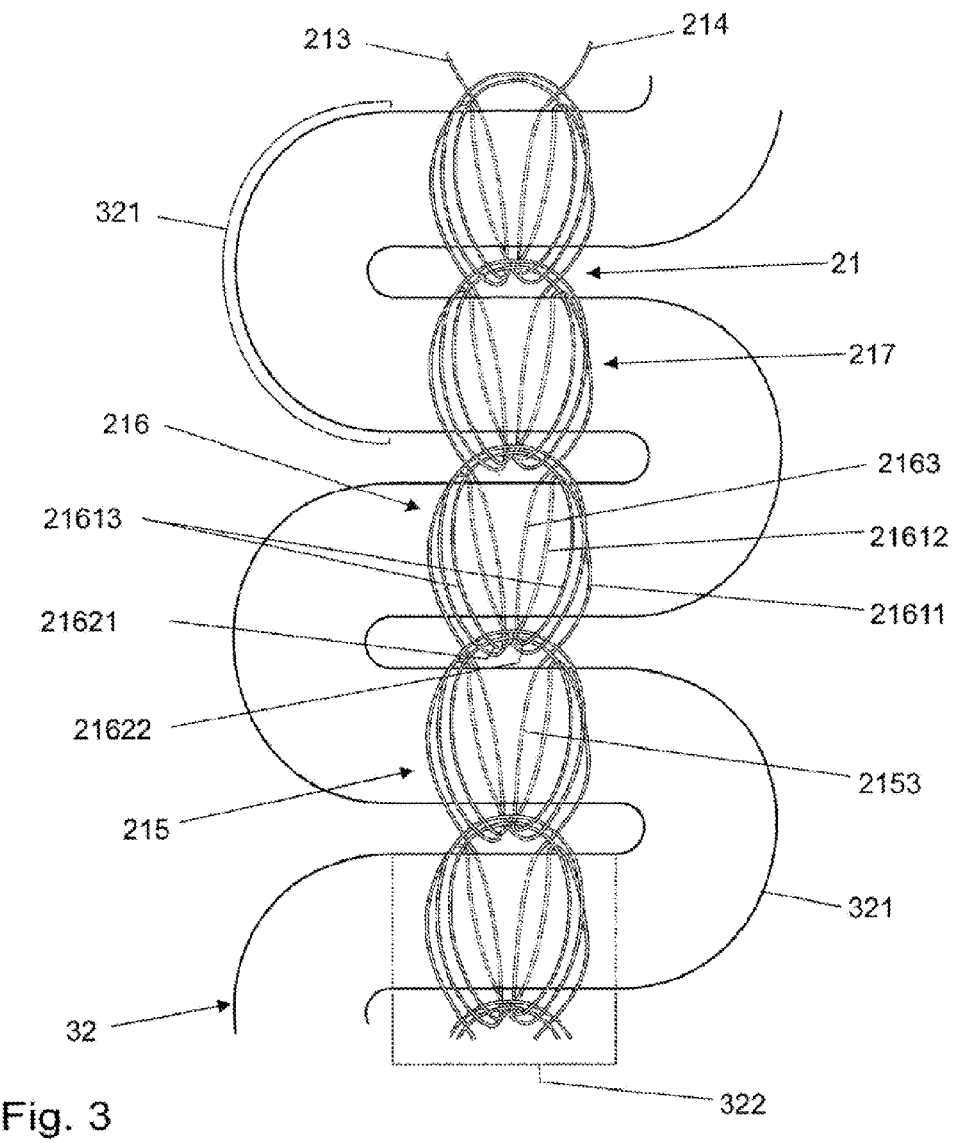
FIG. 3 illustrates region B of the net from FIG. 1, FIG. 4 schematically illustrates an alternative embodiment of the net according to the present invention in a perspective view.

The warps 2 are made of inextensible polyester threads coupled by means of a tightening chain weave presented in details on FIG. 2 and FIG. 3. In a schematic view of FIG. 1 tightening chain weave of the warps is illustrated in a symbolic manner by placing weave loops overlapping each other between lines representing warps.

The fiber of the weft 3 is elastic and made of rubber latex. This fiber forms loops of circumferential sections 31 and longitudinal sections 32. The circumferential sections 31 run transversely relative to the warps 2 crossing them in nodal points 4 the structure of which is presented in details in FIG. 2. On longitudinal sections 32 the fiber of the weft 3 is helically interweaved through loops formed by threads of one of the warps 2, constituting the main warp 21, thus forming characteristic externally outstanding loops 321. The remaining warps 22, with which the weft fiber 3 is weaved in nodal points 4 on the circumferential sections 31, are auxiliary additional ones.

Elasticity of the fiber of the weft 3 from one hand and inextensibility of the warps from the other makes the net of such a construction to be extensible circumferentially yet substantially longitudinally inextensible. Thanks to this feature such a net shall take the shape of a longitudinal product put therein. In FIG. 1, the net 1 is presented in a tubular form representing its form after pulling over a tubular cold meat product depicted by thin dashed lines.

FIG. 2 presents detailed view of a warp 2 section in a nodal point 4 indicated in FIG. 1 as region A. As shown the warp 22 is a string formed by two threads 23, 24 connected by means of a tightening chain weave. The weave is formed in such a way that the threads 23, 24 after exiting from one loop 25 of the weave run in the opposite directions forming the next loop 26 of the weave (sections 261), and then the threads enter into the interior of the previous loop 25 from the opposite side than the side which they were previously exiting from, and are enfolded around the previous loop 25 (sections 262) and further the threads are in an interleaving manner put longitudinally across through the current loop 26 (sections 263), from which in turn the threads exit in order to form a subsequent loop in a manner analogical to a way of forming the loop 26. The characteristic feature of such a tightening chain weave is thus tightening of loops 25, 26 occurring during longitudinal stretching the threads 23, 24 forming the loops.

In the presented embodiment for interweaving the weft fiber 31 in order to form a nodal connection 4, the above-described regular tightening chain weave of a warp is slightly modified in a loop 27 that precedes the node 4. Intermediate sections 273 constituting a transition to the next loop 28 are not passed through the inside the loop 27 in an interleaving manner but after enfolding 272 over the previous loop they are running on the exterior of the current loop 27 and, from a viewpoint of a person looking at the drawing FIG. 2, archwise transversely relative to the weft 31 forming first parts 2811 of the oppositely running sections 281 of a nodal loop 28. After crossing each other, the sections 2811 transform into sections 2812 which this time run on the second side of the weft fiber 31 and after forming a complete loop 28 are enfolded on sections 282 around the previous loop 27, and subsequently run crosswise relative to the fiber 31 from the side of a person looking at the drawing forming the sections 283 longitudinally interweaved through the current loop 28 and exiting in order to form the loop 25.

All nodal points 4 of the net 1 from FIG. 1 have structures analogical to the structure presented in FIG. 2.

FIG. 3 presents a detailed view of a fragment of a weave of a longitudinal section 32 of the weft 3 with the main warp 21 of the net 1 identified in FIG. 1 as region B.

The longitudinal section 32 of the weft 3 comprises alternate external sections forming external loops 321 and internal sections 322 running between the threads 213, 214 of the main warp 21 substantially perpendicularly relative to its longitudinal axis.

Each of the external sections 322 of the longitudinal weft 32 is interweaved between the threads 213, 214 of the main warp 21 in a certain manner analogically to the method of interweaving circumferential sections 31 of the weft 3 in nodal points 4 between the threads 23, 24 of the additional warp 22 as presented in FIG. 2.

The structure shall be described with reference to one thread of the main warp, wherein the run of the second thread is analogical with only a difference that on the sections forming a loop of an interlacement, the threads run in opposite directions. Similarly as in additional warps, the threads form a tightening chain weave of loops formed in a slightly different manner but having analogical properties of tightening loops under the influence of longitudinal tensile force acting on its threads.

After leaving one loop, the end section 2153 of one of the threads of the loop 25 runs from the side of a person looking at the drawing transversely through an internal sections 322 of the weft fiber 32 forming the starting section 21611 of the next loop 26. Subsequently it is enfolded running behind the weft 322 as a section 21612 which transforms into a section 21621 of the first enfolded part formed around the threads forming the previous loop 25, which section in turn transforms into a section 21613 running in a looped manner from the side of the person looking at the drawing relative to the weft 322 forming the main part of the loop 216. The looped section 21613 transforms into a section 21622 of the second enfolded part formed around the threads forming the previous loop 25, which subsequently transforms into the end section 21163 of the loop 26 interweaved longitudinally through this loop and running behind internal sections 322 of the weft 32 in order to form the next loop 217.

In the presented embodiments, the internal sections 322 of the longitudinal weft 32 are interweaved in each neighboring loop of the tightening chain weave of the longitudinal warp 21.

According to the present invention it is however not required for internal sections of longitudinal sections of a weft to be interweaved through all neighboring consecutive loops of a tightening chain weave of a main warp.

Between the neighboring internal sections "empty" loops of a weave of a warp having arbitrary appropriate structure may be present, in particular loops having a structure with an elastic fiber of a weft interweaved through loops or a structure of the loop 25, 26 of the auxiliary additional warp from the FIG. 2.

Figure 4:
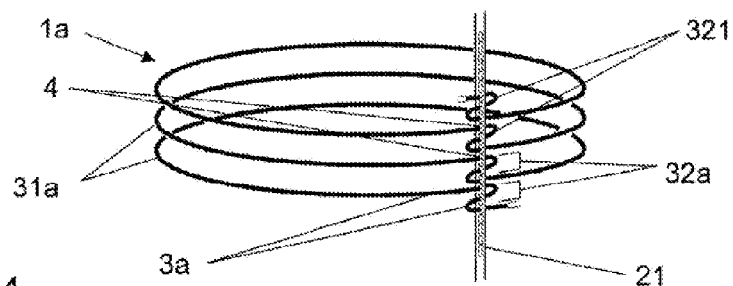

FIG. 4 presents schematically one of the simpler embodiments of a net 1a according to the present invention, which comprises only one main warp 21 of the structure presented in FIG. 3. The longitudinal sections 32a of the weft 3a are formed solely from two oppositely oriented external loops 321. The exit points of the weft 3a of the net 1a on the circumferential sections 31a form nodal points 4 of a structure analogical to the nodal structure presented in FIG. 2.

Although putting a net of such an elementary construction comprising only one main warp with looped circumferential weft sections extending therefrom on a product may require greater care than in case of a net provided with more warps, production of such a net is exceptionally simple and a surface of products wrapped up in such a net will feature an original shape.

Figure 5:
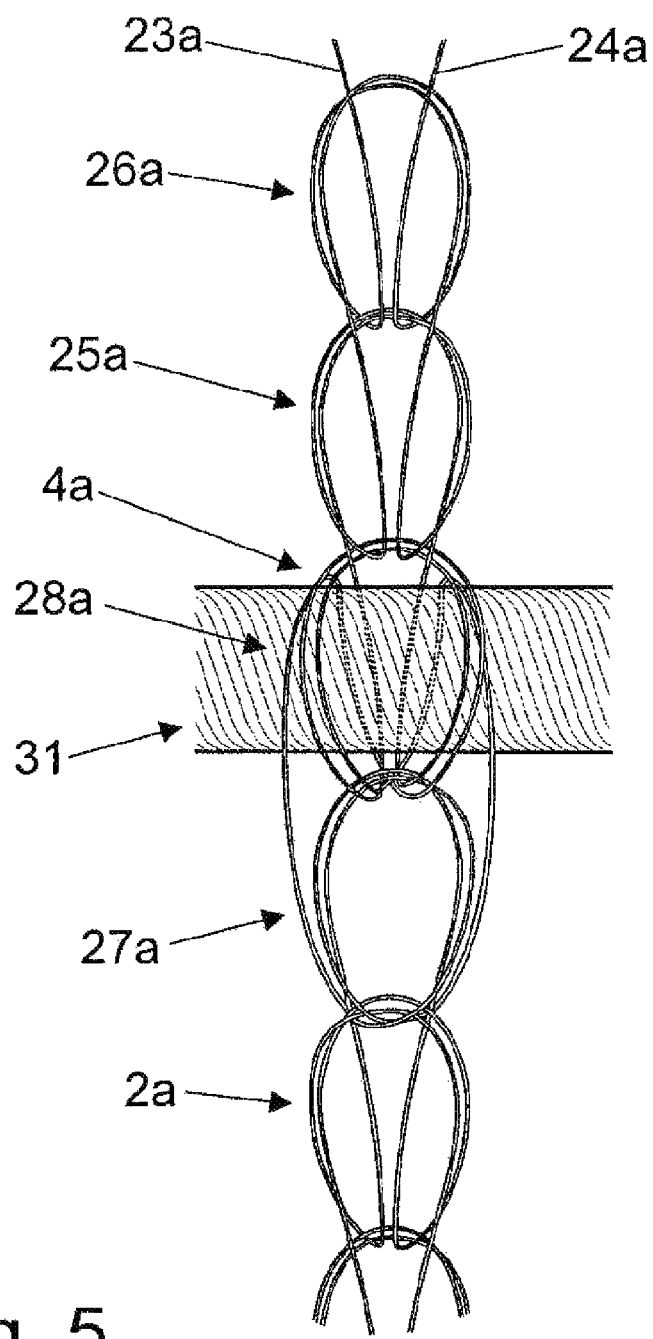
FIG. 5 presents yet another alternative embodiment of an interweave of a weft through a warp in a nodal point indicated in FIG. 1 as the region A.

FIG. 5 presents an alternative example of interweaving circumferential sections of a weft 31 through a warp 2a formed from two threads 23a, 24a interconnected with each other by means of a tightening chain weave, which forms a nodal point 4a indicated in FIG. 1 as the region A.

The structure of an interlacing loop 28a of a warp 2a is the same as the structure of the interlacing loops 215, 216 of the main warp 21 presented in FIG. 3, through which the internal section 322 of the longitudinal section 32 of the weft 3 is interweaved.

Structures of the remaining loops are in this case the same as the structures of the corresponding loops from FIG. 2. That is to say, the structure of the loop 27a preceding the loop 28a is the same as the structure of the loop 27 from FIG. 2, while the structure of the remaining loops 25a, 26a of the warp 2 is the same as the structure of the "regular" loops 25, 26 from FIG. 2.

In further embodiment of the present invention, not presented in the drawing, an elastic weft fiber may be additionally provided with an external braid made of inextensible fibers such as polyester fibers. Using such a braid decreases a possibility of dislocation of weft fiber in nodal points of its transversal passage between threads of warps and, furthermore, by appropriate selection of braid thread type and method of winding of a braid it may be used to define appropriate elasticity of the weft.

In an another alternative embodiment of a net according to the present invention, such as for example the net presented in FIG. 1, the net main warp, with which a weft . fiber is interweaved, may be covered by a layer of adhesive agent. In such a manner the adhesive agent covering external surfaces of fibers as well as the internal spaces therebetween fixedly joins warp fibers with a weft fiber. Additionally the agent is to some extent absorbed by a weft fiber and its optional braid as well as by warp threads. As a result of using an adhesive agent, after its fixation and curing, a warp coated therewith acquires a property of longitudinal inextensibility, similarly as additional warps not having the weft interweaved therein. In a case of employing a net for cold meat products provided with layers spread in a liquid state over the product and congealing on a product, such as for example collagen casings, the casing itself may provide this adhesive agent function, since collagen casings generally comprise an adhesive constituent.

Moreover, in some embodiments, a net according to the present invention may comprise a greater number of main warps. In such a case, one circumferential section of a warp does not need to run around a net over its whole circumference (i.e. over 360°) but may have smaller angular length forming chord sections and may be interweaved in several main warps. According to the present invention, it is essential for circumferential sections to be separated by longitudinal weft sections, which are at least once interweaved through at least one main warp substantially perpendicularly relative to its longitudinal axis passing through loops of its at least one substantially inextensible thread, and which have serpentine run comprising at least two external loops.

Although in the presented invention embodiments, both the main warps as well as additional warps are made of two threads, it is only required that a weave of a main warp is a tightening chain weave, in which weave loops are tightened under longitudinal tensile force acting on weave threads. For a skilled technician it is obvious that such a weave may be formed from an arbitrary number of threads, in particular even from single thread appropriately interweaved forming weave loops by itself.

The invention claimed is:

1. An elastic longitudinal net of a closed periphery, in particular a net for containing longitudinal food products therein, the net having a form of a sleeve, the elastic longitudinal net comprising:
   at least one longitudinal main warp (21) formed by a tightening chain weave having at least one substantially inextensible thread (213, 214), and
   at least one weft (3) including at least one elastic fiber and having circumferential sections (31), ends of the at least one fiber being interweaved substantially perpendicularly between said at least one substantially inextensible thread (213, 214) of said at least one main warp (21), and
   longitudinal sections (32) located between neighboring circumferential sections (31) and running substantially concurrently relative to and weaved with said at least one main warp (21),
   wherein said longitudinal sections (32) of said at least one weft (3) are at least once interweaved through said at least one main warp (21) substantially perpendicularly relatively to a longitudinal axis thereof, passing through loops (215, 216) of said at least one substantially inextensible thread (213, 214) of said at least one main warp (21), for forming a serpentine run having at least two external loops, said longitudinal sections (32) of said at least one weft (3), which are weaved with said at least one main warp (21), being at least partially coated with an adhesive which is an edible glue.

2. The elastic longitudinal net according to claim 1 wherein the at least one elastic fiber is made of rubber latex.

3. The elastic longitudinal net according to claim 1 wherein said at least one elastic fiber of said at least one weft is provided with an external, braid made of inextensible fibers.

4. The elastic longitudinal net according to claim 1 wherein said at least one elastic fiber of said at least one weft is provided with an external helical braid made of inextensible polyester fibers.

5. The elastic longitudinal net according to claim 1, further comprising at least one additional warp (22) substantially parallel to said at least one main warp (21), wherein said longitudinal sections (32) of said at least one weft (3) are interweaved perpendicularly between threads (23, 24) of said at least one additional warp (22).

6. The elastic longitudinal net according to claim 5 wherein the at least one substantially inextensible fiber is made of polyester.

7. The elastic longitudinal net according to claim 5 wherein the at least one elastic fiber is made of rubber latex.

8. The elastic longitudinal net according to claim 5 wherein said at least one elastic fiber of said at least one weft is provided with an external, braid made of inextensible fibers.

9. The elastic longitudinal net according to claim 5 wherein said at least one elastic fiber of said at least one weft is provided with an external helical braid made of inextensible polyester fibers.

10. The elastic longitudinal net according to claim 1 wherein the at least one substantially inextensible fiber is made of polyester.

11. The elastic longitudinal net according to claim 10 wherein the at least one elastic fiber is made of rubber latex.

12. The elastic longitudinal net according to claim 10 wherein said at least one elastic fiber of said at least one weft is provided with an external, braid made of inextensible fibers.

13. The elastic longitudinal net according to claim 10 wherein said at least one elastic fiber of said at least one weft is provided with an external helical braid made of inextensible polyester fibers.

* * * * *